United States Patent [19]

Myers et al.

[11] 4,065,522
[45] Dec. 27, 1977

[54] IONIC SULFONATE-MODIFIED THERMOPLASTIC RESINS

[75] Inventors: Charles Louis Myers, Belpre, Ohio; Michael Kent Rinehart, Parkersburg, W. Va.

[73] Assignee: Borg-Warner Corporation, Chicago, Ill.

[21] Appl. No.: 720,534

[22] Filed: Sept. 7, 1976

[51] Int. Cl.$^2$ .............................................. C08L 51/04
[52] U.S. Cl. ..................... 260/880 R; 260/79.3 MU; 260/876 R; 260/879; 260/881; 260/885
[58] Field of Search ................. 260/880 R, 79.3 MU, 260/879, 881, 885

[56] References Cited

U.S. PATENT DOCUMENTS

| | | | |
|---|---|---|---|
| 2,859,191 | 11/1958 | Turnbull | 260/79.3 MU |
| 2,971,935 | 2/1961 | Floria | 260/79.3 MU |
| 3,332,904 | 7/1967 | LaCombe | 260/79.3 MU |
| 3,516,974 | 6/1970 | Rinkler | 260/79.3 MU |
| 3,592,655 | 7/1971 | Dykstra | 260/79.3 MU |
| 3,755,236 | 8/1973 | Puskas | 260/79.3 MU |
| 3,781,248 | 12/1973 | Sakai | 260/79.3 MU |

Primary Examiner—Paul R. Michl
Attorney, Agent, or Firm—Richard J. Schlott

[57] ABSTRACT

Thermoplastic copolymers and graft polymers containing from 1 to 15% by weight of a copolymerized salt of an ethylenically unsaturated vinyl sulfonic acid which exhibit improved heat distortion temperature properties while retaining excellent melt processing characteristics, and a method for their preparation.

4 Claims, No Drawings

IONIC SULFONATE-MODIFIED THERMOPLASTIC RESINS

BACKGROUND OF THE INVENTION

This invention pertains to thermoplastic resins, particularly vinyl copolymers and graft polymers comprising a rigid matrix and a rubbery substrate and blends thereof, which are modified by including from 1 to 15 wt.% of copolymerized ionic sulfonate units, and to a method for increasing the heat distortion temperature of copolymers and graft polymers. The ionic sulfonate units provide strongly associative crosslinking sites which markedly improve the upper use temperatures of the resins while unexpectedly retaining the desirable melt processing characteristics of the unmodified resins.

Polymers containing copolymerized carboxylic acid units as ionic crosslinking sites are widely known. Converted to the corresponding ionic salts, such as, for example, the sodium, calcium and barium salts, these carboxylic acid units form strong associative bonds between chains that effectively crosslink the resins at normal temperatures. These ionic crosslinks impart lowered creep and elevated heat distortion properties to the resin, permitting their use at higher temperatures. Under conventional melt fabrication or molding condition the ionic bonds are unable to resist dynamic shear, and processing thus is made possible.

The metallic ion component of the salts may be monovalent or multivalent. In general, the divalent ions, such as calcium, strontium, barium and the like, are highly desirable for their ability to generate strongly associated crosslinks and greatly improve the upper use temperature of the resin. Attaining the maximum improvement in use temperature properties with carboxylic acid based graft polymer systems, however, can be accomplished only by sacrificing thermal processability. The divalent ion crosslinking systems, particularly in the case of graft polymers, become extremely difficult to process because the strength of these ionic associations is not greatly reduced at elevated temperatures, and the crosslinking effectiveness is thus retained well into temperature range normally employed for melt processing. It therefore becomes necessary to employ a lowered level of acidic groups or a less effective metallic ion and compromise higher use temperature properties in order to retain reasonable processing characteristics. For that reason, copolymers and graft polymers having ionic crosslinks which substantially improve heat distortion properties without a concomitant decrease in melt processability would thus be a highly useful advance in the graft polymer art.

SUMMARY OF THE INVENTION

This invention pertains to ionically crosslinked thermoplastic copolymers, to graft polymers comprising a rigid matrix and a rubbery substrate and to blends thereof. More particularly, the copolymers are rigid thermoplastic matrix polymers prepared from one or more vinyl monomers copolymerized with from 1 to 15 wt.% based on final polymer, of a copolymerizable sulfonate monomer to provide sulfonic acid groups in the final structure. The graft polymers are modified conventional thermoplastic resins prepared by copolymerizing at least one rigid phase monomer in the presence of a rubbery polymeric substrate, the modification being accomplished by including from 1 to 15 wt.% based on final polymer, of a copolymerizable sulfonate monomer to provide sulfonic acid groups in the final structure. The sulfonic acid groups, when in the form of sulfonate salts of monovalent or multivalent metallic ions, provide ionic crosslinking associations which markedly increase the heat distortion and upper use temperature properties of the graft polymer. These sulfonic acid salts readily dissociate at the processing temperature of the resin, thereby greatly reducing the association between the polymer chains at these elevated temperatures to permit ready thermal processing.

DETAILED DESCRIPTION

The graft polymers are those generally referred to as impact thermoplastics and include resins prepared by the graft polymerization of one or more vinyl monomers in the presence of a rubbery polymeric substrate as well as resins prepared by blending a rigid matrix polymer with a grafted rubbery substrate. The grafting monomers useful for these purposes include monomers selected from the group consisting of styrene, alpha-methylstyrene, vinyltoluene, acrylonitrile, methacrylonitrile, the lower alkyl esters of acylic acid and the lower alkyl esters of methacrylic acid. The rubbery polymeric substrates comprise up to 95% of the total weight of the graft polymer and include polybutadiene, rubbery copolymers of styrene and butadiene containing up to 50 wt.% styrene, acrylic rubber and nitrile rubber.

Specific examples of graft polymers and blends that may usefully be modified by including a copolymerizable sulfonate monomer in their preparation are the ABS resins including graft polymerized mixtures of styrene and/or alpha-methylstyrene with acrylonitrile on polybutadiene or on rubbery styrene-butadiene copolymer substrates and blends thereof with copolymerized styrene and acrylonitrile resins; MBS and MABS resins including graft polymerized mixtures of styrene with methyl methacrylate on polybutadiene or rubbery styrene-butadiene copolymer substrates (MBS) and graft polymerized mixtures of styrene, acrylonitrile and methyl methacrylate on polybutadiene or rubbery styrene-butadiene copolymer substrates (MABS), and blends thereof with styrenemethyl methacrylate copolymers or styrene-methyl methacrylateacrylonitrile terpolymers; graft polymers of methyl methacrylate and optionally a $C_1$ – $C_4$ alkyl acrylate or methacrylate on rubbery $C_2$ – $C_8$ alkyl acrylate polymer substrates and blends thereof with methyl methacrylate, and graft polymers of styrene on a polybutadiene substrate. It will be understood by those skilled in the art that the preparation of these resins is widely practiced in the art and further that minor amounts of modifying monomers and particularly difunctional and trifunctional vinyl or acrylate monomers may be included, particularly in the preparation and modification of the rubbery substrate to impart improved impact properties to the final resin.

The copolymers are those generally described as rigid thermoplastics and are prepared by copolymerization of one or more vinyl monomers, together with the copolymerizable sulfonate monomer in the absence of a rubbery substrate. Those vinyl monomers useful in preparing the graft polymers as set forth herein, including the vinyl monomers selected from the group consisting of styrene, alpha-methyl styrene, vinyl toluene, acrylonitrile, methacrylonitrile, the lower alkyl esters of acrylic acid and the lower alkyl esters of methacrylic acid are particularly useful.

The copolymerizable sulfonate monomer will be a salt of an ethylenically unsaturated sulfonic acid selected from the group consisting of vinyl sulfonic acid, allyl sulfonic acid, methallyl sulfonic acid, styrene sulfonic acid and acrylamido-alkyl sulfonic acids. The sulfonate monomers are employed as comonomers, and in the grafting reaction will replace a portion of the grafting monomers. Where the impact resin is prepared by blending a grafted rubbery substrate with a rigid matrix polymer, the sulfonate monomer will be included both in the preparation of the grafted rubbery substrate as a grafting comonomer and as a comonomer in the polymerization of the rigid matrix polymer. The amount of copolymerizable sulfonate monomer employed may be varied from about 1 to about 15 wt.% of the final product composition. At lower levels only minor effects on thermal properties will obtain, while greater levels will significantly affect the overall balance of physical properties.

The strength of the ionic crosslinking interactions will vary with the particular metallic counterion employed. As with the carboxylate-based ionomers, monovalent ions of Group I of the periodic chart including $Li^+$, $Na^+$, $K^+$ may be employed as may the divalent ions of Group II including $Ca^{+2}$, $Sr^{+2}$, $Ba^{+2}$, $Zn^{+2}$ and the trivalent ions of Group III including $Al^{+3}$ and the like. In general, the monovalent ion form of the monomer, preferably the sodium salt, will be employed in the preparation of the resin resulting in a product having sodium sulfonate crosslinking groups. These sodium or other monovalent ions may be replaced with di-or trivalent metallic ions by ion exchange techniques. This will most conveniently be accomplished by coagulating the resin from emulsion with a solution containing a dissolved salt of the desired di- or trivalent metallic ion.

Any of the conventional copolymerization processes may be employed to prepare the modified copolymers of this invention, including bulk, bulk-suspension, solution, and emulsion processes. Emulsion processes are preferred inasmuch as the product latices may be readily blended prior to coagulation and ion exchange to introduce multivalent metallic ions is readily accomplished during the coagulation step. The coagulated latex will, after drying, be ready to use.

The practice of this invention will be made more readily apparent by consideration of the following examples, which are provided by way of illustration and not limitation. In the following examples, the reaction conditions and methods were selected after preliminary experiments to determine a suitable process for preparing each polymer composition.

EXAMPLE 1.

Graft Polymer Latex Preparation

A polymer reactor was charged with 1519.4g of a polybutadiene latex containing 600g of polybutadiene latex containing 600g of polybutadiene solids, 896.2g of water, and 20g of Dresinate 731 resin acid emulsifier. The reaction mixture was stirred and heated to 70° C and the following solutions were fed to the reactor over a 100 minute period.

1. 96.2 of acrylonitrile, 288.5g of styrene, and of cumene hydroperoxide.
2. 15.3 of sodium allyl sulfonate in 102.1g of water.
3. 0.35 of tetrasodium pyrophosphate, 2.43g of dextrose, and 0.012g ferrous sulfate in 125.8g of water.

The reaction was continued for two hours to give a graft polymer latex having 60% rubber component and 1.5% sulfonate level in the form of the sodium salt.

EXAMPLE 2.

Copolymer Latex Preparation With Sodium Allylsulfonate

A polymer reactor was charged with 2003.8g of water, 0.75g of potassium persulfate, 37.5g of sodium alkyl benzene sulfonate emulsifier, and 0.225g of sodium hydroxide. The reaction mixture was stirred and heated to 70° C and the following solutions were fed continuously to the reactor over a 100 minute period.

1. 450.1g of alpha-methyl styrene, 200.9g of acrylonitrile, 41.6g of styrene, and 1.125g of t-dodecyl mercapton.
2. 57.5g of sodium allyl sulfonate in 163.7g of water.
3. 3.75g of potassium persulfate in 246.2g of water.

The reaction was continued for four hours at 70° C. The product latex contained 7.67% allyl sulfonate monomer in the form of the sodium salt (5 mole %).

EXAMPLE 3.

Copolymer Preparation with Sodium Vinyl Sulfonate

A copolymer was prepared at 75° C with the following solutions by the method of Example 2.

1. 15.0g of sodium alkyl benzene sulfonate emulsifier and 0.3g potassium persulfate in 821.0g of water.
2. 182.3g of alpha-methyl styrene, 81.3g of acrylontrile, 16.8g of styrene, and 0.45g t-docdecyl mercaptan.
3. 19.5 of sodium vinyl sulfonate and 1.5g of potassium persulfate in 79.0g of water.

The product latex contained 6.50% sodium vinyl sulfonate (5 mole %).

EXAMPLE 4.

Copolymer Preparation with Sodium Acrylamido-2-Methyl Propane Sulfonate.

A copolymer was prepared at 75° C by the method of Example 2, employing the following solutions in the amounts indicated:

1. 37.5g of sodium alkyl benzene sulfonate emulsifier and 0.75g potassium persulfate in 1745.3g of water.
2. 430.6g of alpha-methyl styrene, 192.1g of acrylonitrile, 39.7g of styrene, and 1.125g of t-dodecyl mercaptan.
3. 87.5g of sodium acrylamodi-2-methylpropane sulfonate in 258.4g of water.
4. 3.75g of potassium persulfate in 246.2g of water.

The product latex contained 11.67 wt. percent (5mole %) sodium acrylamido-2-methyl propane sulfonate.

EXAMPLE 5.

Control Copolymer Preparation Containing Methacrylic Acid

A copolymer was prepared at 75° C in a batch reaction, using the following solutions in the amounts indicated.

1. 35.0g of sodium alkyl benzene sulfonate emulsifier in 1555.0g of water.
2. 618.0g of alpha-methyl styrene, 274g of acrylonitrile, 57g of styrene, 50g of methacrylic acid, and 3.0g of t-dodecyl mercaptan.

3. 3.0g of potassium persulfate and 0.6 g of sodium alkyl benzene sulfonate emulsifier in 147.g of water.
4. 2.0g of potassium persulfate and 0.4g of sodium alkyl benzene sulfonate emulsifier in 98.0g of water.

A polymer reactor was charged with solutions 1 and 2. The mixture was stirred and heated to 75° C. Then solution 3 was charged and the reaction continued for two hours. Solution 4 was charged and the reaction terminated after an additional four hours. The product latex contained 5.0 wt.% (5 mole %) methacrylic acid.

EXAMPLES 6.

Control Copolymer Preparation

A copolymer having no sulfonate crosslinking monomer was prepared by the process of Example 2, using the following solutions in the amounts indicated:
1. Water 1800g Tetrasodium Pyrophosphate 1.0g Sodium Alkyl benzene sulfonate emulsifier 30.0g sodium hydroxide 0.09g.
2. 650g alpha-methyl sturene, 290g acrylonitrile, 60g styrene, and 7.5g of t-dodecyl mercaptan.
3. 50.0g water and 1.0g potassium persulfate.

The product latex, containing 100g of an alpnha-methyl styrene - styrene -acrylonitrile 65/6/29 copolymer was coagulated with calcium chloride, filtered, washed and dried at 60° C in a circulating air oven.

EXAMPLES 7 - 16

Ion-Exchange Coagulated Copolymers

A series of alpha-methyl styrene - styrene - acrylonitrile (65/6/29) copolymers having 5 mole % sulfonate or carboxylate monomer component and various counter-ions were prepared by coagulating the latices of Examples 2-5 with the appropriate calcium, zinc or aluminum salt. Where the sodium salt form was desired, the sodium latices were directly steam-coagulated without adding a further salt, or were evaporated. The coagulated latices were then collected by filtration, washed with water, and dried at 60° C in a circulating air oven.

The copolymer resins were prepared for testing by first melt-mixing at 380°–400° F on a Brabender mixer with 0.5 part magnesium stearate per hundred parts of resin, then milling at 350° F on a two-roll mill. The cooled mill slabs were then compression molded to form plaques for test purposes. The melt rheology and test data are summarized in Table I.

Table I

| | | Alpha-methyl Styrene - Styrene - Acrylonitrile (65/6/29) copolymers with 5 mole % ionic monomer component; Physical properties. | | | | |
|---|---|---|---|---|---|---|
| Ex. No. | Latex[1] No. | Sulfonate[2] Monomer | Counter[3] ion | HDT[4] ° F | Melt Viscosity[5] 500° F | 600° F |
| 7 | 2 | SAS | Ba | 252 | 2.6×10³ | |
| 8 | 3 | SVS | Ba | 244 | | 0.87×10³ |
| 9 | 4 | AMPS | Ba | 249 | 3.2×10³ | |
| 10 (control) | 5 | (SMA) | Ba | 248 | | 8.3×10³ |
| 11 | 2 | SAS | Ca | 241 | 2.8×10³ | |
| 12 (control) | 5 | (SMA) | Ca | 248 | | 3.2×10³ |
| 13 | 3 | SVS | Zn | 228 | | 0.58×10³ |
| 14 (control) | 5 | (SMA) | Zn | 250 | | 2.6×10³ |
| 15 | 3 | SVS | Al | 236 | | 0.69×10³ |
| 16 | 2 | SAS | Na | 237 | 2.2×10³ | |
| 6 (control) | 6 | NONE | — | 233 | 1.7×10³ | 0.65×10³ |

Notes:
[1]Latex No. = latex preparation of Example No. indicated.
[2]SAS = sodium allyl sulfonate; SVS = sodium vinyl sulfonate; AMPS = sodium acrylamido-2-methyl propane sulfonate; SMA = sodium methacrylate. Each latex contains 5 mole % of ionic monomer indicated.
[3]Latex steam-coagulated with appropriate salt of counterion indicated.
[4]HDT = heat distortion temperature at 264 psi, compression molded ½" × ¼" bars, unannealed.
[5]Melt viscosity at 2000 sec⁻¹ shear rate, Monsanto Capillary Rheometer, 0.020 in. capillary diameter, 15/1 L/D.

It is apparent from these data that the heat distortion temperatures of the resins containing ionic monomer units, Examples 7-16, are significantly higher than for the unmodified resin of Example 6. The barium salts of the sulfonate containing resins, Examples 7-9, each exhibit markedly lower melt viscosities than that of the control resin containing a carboxylate monomer, Example 10. Similarly, the calcium salt of the sulfonate-containing resin, Example 11 is lower in melt viscosity than the corresponding carboxylate resin, Example 12, and the zinc salt of the sulfonate-containing resin Example 13, has a markedly lower melt viscosity then the corresponding carboxylate resin, Example 14.

The sulfonate-containing resins, although markedly increased in heat distortion temperature as compared with the unmodified control resin of Example 6, appear to exhibit melt viscosities very nearly like that of the unmodified resin, both at 500° F (Compare Examples 7, 9, 11 and 16 with Example 6). The carboxylate-modified resins, however, exhibit melt viscosities which are markedly higher than that of the unmodified resin, even at 600° F (compare Examples 10, 12 and 14 with Example 6). That the sulfonate-modified resins would exhibit increased heat distortion temperatures without a correspondingly large increase in melt viscosity is quite surprising, particularly in view of the known properties of carboxylate-modified resins. These resins thus have significantly improved upper use temperature properties while retaining the desirable melt processing characteristics of the unmodified resins.

The sulfonate-containing copolymer resins may be employed directly as high temperature resins for many uses. However, where the impact properties of these copolymers are deficient for a particular end use, the impact characteristics may be improved by blending with a rubber modified graft copolymer. As set forth in Example 17, one method for preparing useful blends is to mix a rigid, sulfonate-modified matrix polymer latex with a sulfonate-containing grafted rubbery substrate latex and isolate the blend by ionexchange coagulation.

EXAMPLE 17.

Preparation of Impact Resin Blend

The latices of Examples 1 and 2 were blended 75 parts rigid to 25 parts graft by weight (solids basis) by stirring the latices together. A stabilizer mixture (2.5g) containing tris-nonyl phenyl phosphite and 2,2'-methylene-bis-(4-ethyl-6-t-butyl phenol) in a 2.5:1 ratio was added to the latex blend in the form of one emulsion. The blend was then ionexchanged coagulated by adding 27.5 parts by weight $Ba(OH)_2 \cdot 8H_2O$ per 100 parts latex solids and passing steam through the mixture. The coagulated latex was isolated by filtration, washed with deionized water and dried at 60° C in a circulating air oven. The product polymer blend had 12.5 wt% rubbery component as grafted polybutadiene, and 4.5 wt.% sulfonate monomer component in the form of the barium salt.

The impact properties of the rigid matrix are improved by the presence of the grafted rubber substrate while the improved upper use temperature properties are retained, as shown by the physical property data given in Table II. test specimens were prepared by first melt-mixing the resin at 380°–400° F on a banbury mixer with 0.5 part magnesium stearate per hundred parts of resin, then milling at 350° F on a two-roll mill. The cooled mill slabs were then compression molded to form plaques for test purposes.

Table II

Physical properties of a sulfonate-containing, rubber modified impact resin blend, Example 17.

| Property[1] | Sulfonate Resin (Example 17) | Control[2] ABS |
|---|---|---|
| Izod Impact, ft lbs/in Notch (ASTM D-256) | 1.8 | 2.3 |
| HDT (ASTM D-645) | | |
| unannealed, ° F | 237° | 218° |
| annealed, ° F | 263° | 238° |
| Tensile Strength, psi (ASTM D-638) | 7200 | 7200 |
| Flex Creep, 170° F, 500 psi | | |
| 200 hr,% strain | 0.68 | 0.96 |
| 800 hr,% strain | 0.82 | 1.12 |

Notes:
[1]Tensile Strength on injection - molded bars; HDT at 264 psi, ¼" × ¼" bars.
[2]Commercial High Heat ABS.

The high heat properties of sulfonate-containing resins are thus clearly retained when impact modified with a grafted rubbery substrate resin, and the resulting impact resin exhibits both a higher heat distortion temperature and improved creep properties at elevated temperatures, compared with a conventional high heat ABS resin.

The invention will thus be seen to be broadly described as thermoplastic vinyl copolymers and graft polymers comprising a rigid matrix and a rubbery substrate and blends thereof which are modified by the including of from 1 to 15 wt.% of copolymerized ionic sulfonate units, which have markedly improved heat distortion and upper use temperatures, and to a method for increasing the heat distortion temperatures and upper use temperatures of copolymer and graft polymer resins. It will be understood that the termoplastic resins of this invention may be blended with other resins and may be further compounded with colorants, stabilizers, lubricants, plasticizers, fillers and the like. Many other variations and modifications will be apparent to those skilled in the art without departing from the spirit and scope thereof, which invention is defined solely by the appended claims.

We claim:

1. A thermoplastic copolymer composition comprising: graft polymers containing from 5 to 95 wt.%, based on final polymer of at least one vinyl monomer selected from the group consisting of styrene, alphamethylstyrene vinyl toluene, acrylonitrile, methacrylonitrile, the lower alkyl esters of acrylic acid and the lower alkyl esters of methacrylic acid, and from 15 to 1 wt.% based on final polymer of a monomer selected from the group consisting of the Group II and Group III metal salt of a copolymerizable ethylenically-unsaturated sulfonic acid as grafting monomer, said grafting monomers copolymerized in the presence of from 95 to 5 wt.%, based on final polymer, of a rubbery substrate polymer selected from the group consisting of polybutadiene, styrenebutadiene copolymers containing up to 50% by weight styrene, and rubbery $C_2-C_8$ alkyl acrylate copolymers.

2. The thermoplastic copolymer composition of claim 1 wherein said vinyl monomer is a mixture of styrene and acrylonitrile.

3. A thermoplastic copolymer blend composition comprising blends of:
   copolymers containing from 99 to 85 wt.% of at least one vinyl monomer selected from the group consisting of styrene, alpha-methylstyrene, vinyl toluene, acrylonitrile methacrylonitrile, the lower alkyl esters of acrylic acid, and the lower alkyl esters of methacrylic acid, and from 1 to 15 wt.% of a monomer selected from the group consisting of the Group II and Group III metal salt of a copolymerizable ethylenically-unsaturated sulfonic acid monomer, with
   graft polymers containing from 5 to 95 wt.% based on final polymer of at least one vinyl monomer selected from the group consisting of styrene, alpha-methylstyrene vinyl toluene, acrylonitrile, methacrylonitrile, the lower alkyl esters of acrylic acid and the lower alkyl esters of methacrylic acid, and from 15 to 1 wt.% based on final polymer of a monomer selected from the Group II and Group III metal salt of a copolymerizable ethylenically-unsaturated sulfonic acid as grafting monomer, said grafting monomers copolymerized in the presence of from 95 to 5 wt%, based on final polymer, of a rubbery substrate polymer selected from the group consisting of polybutadiene, styrene-butadiene copolymers containing up to 50% by weight styrene, and rubbery $C_2-C_8$ alkyl acrylate copolymers.

4. A method for providing processable thermoplastic resins having improved heat distortion temperature properties comprising copolymerizing 50 parts by weight of:
   A. At least one monomer selected from the group consisting of styrene, alpha-methylstyrene, vinyl toluene, acrylonitrile, methacrylonitrile, the lower alkyl esters of acrylic acid and the lower alkyl esters of methacrylic acid, and
   B. from 15 to 1% by weight, based on final copolymer, of a monovalent metal salt of an ethylenically unsaturated sulfonic acid monomer selected from the group consisting of vinyl-sulfonic acid, styrene sulfonic acid, allyl sulfonic acid, methallyl sulfonic acid and acryl-amidoalkyl sulfonic acids, in the presence of from 5 to 95 parts by weight of:

C. a rubbery substrate polymer selected from the group consisting of polybutadiene, styrene-butadiene copolymers containing up to 50% by weight styrene, and rubbery $C_2$-$C_8$ alkyl acrylate polymers, followed by ionexchange coagulation said resins in the presence of a metal ion selected from the group consisting of the metal ions of Group II and Group III.

* * * * *